UNITED STATES PATENT OFFICE.

JOSEPH H. AMIES, OF PHILADELPHIA, PENNSYLVANIA, ASSIGNOR TO THE AMIES PAVEMENT COMPANY, OF CAMDEN, NEW JERSEY.

PAVING-BLOCK.

SPECIFICATION forming part of Letters Patent No. 525,832, dated September 11, 1894.

Application filed September 14, 1893. Serial No. 485,474. (No specimens.)

*To all whom it may concern:*

Be it known that I, JOSEPH H. AMIES, a citizen of the United States, residing at Philadelphia, in the county of Philadelphia and State of Pennsylvania, have invented new and useful Improvements in Paving-Blocks, of which the following is a specification.

I take any fibrous materials, such as hay, straw, weeds, reeds, and grasses, either in their raw or cured states, or I take peat, especially such as is largely composed of long roots and fibers, and I compress them by means of a suitable power press into bales or blocks of any desired dimensions. When I deal with peat, I cut large blocks out of the bog several times larger than the size to which they are to be reduced, and in the act of compression the larger proportion of the moisture is expressed, so that said blocks become virtually dry. While said blocks are in the press I bind them with wire or other proper material, in the same manner as bales of hay are bound, but in a more substantial way, in order that when they are removed from the press they may not again expand, yet at the same time be more or less elastic. These blocks or bales are then submerged into hot coal-tar, or kidney-oil, or a mixture of the two, or in any other substance or composition having the properties of sealing them against the invasion of moisture and air. In this hot liquor they remain until it has penetrated them to a desirable depth, when they are removed and allowed to dry. My object in thus forming and treating said fibrous materials is to secure blocks, which may be used in pavements, having a heart of vegetable matter, and a considerable amount of elasticity, incased or enveloped in a composition which will be impervious to moisture and air, thus preventing decay, and which will not dry nor crack under ordinary conditions of temperature and traffic. I treat my blocks in the manner above described when they are to be covered with a layer or sheet of concrete, after they have been laid in position upon a properly prepared base upon the street; but when they are to be used without any such top covering, I submerge said blocks into a composition of the following materials, namely: kidney-oil, one gallon; coal-tar or bitumen, five gallons; sand or pulverized lime rock, three pounds; hydraulic cement, three pounds. These proportions may be varied according to needs or circumstances without departing from the character or spirit of my invention; or the above composition may be mixed with fine long fibers, and when in a plastic condition may be pressed upon the face of my said blocks.

I find by experiment that the use of kidney-oil with coal-tar or bitumen imparts to the mixture all the qualities of a fixed, or non-drying oil, which permits my blocks to yield to pressure, or to be more or less elastic, without cracking said composition, with which they have been penetrated and enveloped. When said blocks are prepared in the manner last described they may be laid upon a proper base on the street, as closely together as possible, and the interstices may be filled with boiling pitch and kidney-oil mixed, or with any other suitable material having the property of being impervious to moisture. The top covering which I prefer to lay upon said blocks, when they are prepared in the manner first described, is the composition set forth in my Patent No. 512,645, dated January 9, 1894, the said composition being laid down in a plastic condition upon said blocks, and then rolled or tamped until it becomes set and united with the blocks beneath.

I am aware that it is not new to compress bales of hay, cotton, and other vegetable fiber, and bind them with wire, iron, straps, and other binders. I am also aware that it is not new to press a mixture of straw and clay or cement into bricks for building blocks and binding the same with wire. I do not claim broadly any of these devices; but,

Having thus described my invention, what I do claim, and desire to secure by Letters Patent, is—

1. As a new article of manufacture a paving block having a dense central part of compressed vegetable fiber only and an exterior part composed of such fiber saturated with a plastic material impervious to moisure substantially as described.

2. As a new article of manufacture a paving block of peat or equivalent vegetable fiber, having a dense part composed of such material only and an exterior incasing part composed of such material saturated with any
5 resinous composition impervious to moisture substantially as set forth.

In testimony whereof I have hereunto set my hand in the presence of two subscribing witnesses.

JOS. H. AMIES.

Witnesses:
  THOMAS F. GROSS,
  JAS. U. ROBERTSON.